March 26, 1968 W. J. O'SULLIVAN, JR 3,374,830
THERMAL CONTROL PANEL
Filed March 28, 1966 2 Sheets-Sheet 1

INVENTOR
WILLIAM J. O'SULLIVAN, JR.

BY
ATTORNEYS

March 26, 1968   W. J. O'SULLIVAN, JR   3,374,830
THERMAL CONTROL PANEL

Filed March 28, 1966   2 Sheets-Sheet 2

INVENTOR
WILLIAM J. O'SULLIVAN, JR.

BY
ATTORNEYS

United States Patent Office 3,374,830
Patented Mar. 26, 1968

3,374,830
THERMAL CONTROL PANEL
William J. O'Sullivan, Jr., Newport News, Va., assignor to the United States of America as represented by the Administrator of the National Aeronautics and Space Administration
Filed Mar. 28, 1966, Ser. No. 538,908
10 Claims. (Cl. 165—96)

The invention described herein was made by an employee of the United States Government and may be manufactured and used by or for the Government for government purposes without the payment of any royalties thereon or therefor.

This invention relates generally to the thermal control of an enclosure, and relates with particularity to thermo-sensitive panel construction including the provision therein for achieving controllable solar absorptivity/surface emissivity ratio surface for the temperature regulation of space vehicles and the like.

The most significant parameter that can be varied to control the temperature of satellites and space vehicles is the ratio of the solar absorptance to the low-temperature emittance ($a_s/e$) of the exposed vehicle surface area. The expression $a_s/e$ is the ratio of the absorptivity of the face of a plate to a solar radiation ($a_s$) to the emissivity of the face of the plate to thermal radiation ($e$). Since these qualities are dependent only on the surface of an object, the temperature of the object can be adjusted to the desired value by selecting a coating for the object's face that has the requisite value of $a_s/e$. This is the routine procedure used in the design of spacecraft, as more fully disclosed in applicant's copending appplication filed concurrently herewith for Thermal Control Wall Panel, Ser. No. 538,911.

Previous methods of controlling the temperature of space vehicles have included surface oxidation coatings, vapor deposition of thin metallic film coatings, and wholly or partially coating the surface area of the spacecraft with paint to attain the desired effective thermal radiation characteristics. In addition, a recent innovation for designing a thin wall spacecraft for a specific $a_s/e$ ratio surface, where the optical property $a_s$ is the absorptivity of the spacecraft's surface to solar radiation, and $e$ is its emissivity to thermal radiation, is disclosed in U.S. Patent No. 3,176,933 and assigned to the National Aeronautics and Space Administration.

Although each of these prior art temperature control methods was adequate for the purposes intended, the limitations thereof due to the fixed $a/s/e$ ratios somewhat limit their capabilities for use on present and contemplated spacecraft particularly upon changing attitude, or distance relative to the sun, as well as upon long exposure to space environment, where changing conditions may necessitate a change in $a_s/e$ ratios to maintain thermal balance. It is now generally accepted that in the hard vacuum of spatial environment a spacecraft can receive and lose heat only by the process of radiative heat exchange. Thus, the temperature of a particular spacecraft of any given configuration whose exterior surfaces have fixed ratios of ($a_s/e$) depends only on three things: (1) the location of the spacecraft relative to external heat sources, that is, the Sun or any nearby planetary body like the Earth or the Moon, (2) the attitude of the spacecraft relative to the external heat sources, and (3) the rate of heat released inside the spacecraft from chemical or nuclear energy sources.

There is no possible orbit or spacecraft mission of any consequence in which all three of these factors can remain constant. There is thus a definite need in the art for a practical and reliable control surface for space vehicles that will change $a_s/e$ ratio spontaneously, or on command as needed, to facilitate spacecraft temperature control.

Accordingly, it is an object of the present invention to provide a thermal sensitive construction for the control of the $a_s/e$ value of an entire spacecraft or any portion thereof within desired limits.

Another object of the present invention is a method of regulating the thermal balance of a spacecraft by selectively altering the exterior solar absorptivity/surface emissivity ratio value thereof.

An additional object of the present invention is the provision of a liminate panel having predetermined temperature responsive physical property characteristics for attainment of a specific design temperature.

An additional object of the present invention is the provision of a laminated panel construction that absorbs in whole or in part incident electromagnetic radiation until the wall temperature attains the design temperature thereof at which its changeable physical property characteristics causes the wall to become reflective to the incident electromagnetic radiation to thereby automatically stabilize the wall temperature at the design temperature level.

A still further object of the present invention is the provision of a novel panel employed for the attainment of temperature control in a spacecraft when the spacecraft is exposed to solar radiation in the ambient vacuum of space.

The foregoing and other objects are obtained in the present invention by exploiting the inherent molecular structural change of selected materials to provide selectively controllable $a_s/e$ panels useful for temperature environmental control of an enclosure.

The differences in the optical and other physical properties exhibited by different materials are attributable to the differences in the molecular structure between different materials. This indicates that any means whereby the molecular structure of a given material can be altered will also produce a change in some or all of the physical properties of the material. A familiar example is the melting of paraffin by application of heat wherein the manifest molecular structure change from the solid to the liquid state is accompanied by change in the optical property of transparency from translucent to transparent.

The optical as well as other physical properties of some materials are theoretically attributable in whole or in part to the strength of attachment to the nucleus of the satellite electrons surrounding the nucleus of each of the atoms that comprise the molecules of the materials. In most metals, some of these electrons are weakly attached and readily detached, in consequence of which metals generally are good conductors of electricity and heat; exhibit high reflectivity and low transparency to most electromagnetic waves; exhibit the thermionic emission and thermoelectric phenomena, as well as other phenomena related to the freedom of electrons within them.

In contrast, in electric insulators or dielectrics, the satellite electrons are strongly attached and difficult to detach from the atoms comprising the molecules of these materials, in consequence of which insulators or dielectrics exhibit, when pure, poor conduction of electricity and heat; exhibit low reflectivity and high transparency to most electromagnetic waves; do not exhibit thermionic emission and thermoelectric phenomena; as well as exhibiting other phenomena associated with constraint of their electrons.

Between these two extremes of metals and insulators or dielectrics there exist semiconductors which partially exhibit the properties of metals and partially the properties of insulators or dielectrics, dependent upon the particular kind and degree of freedom of their satellite electrons. The association of the optical properties of materials with their molecular structure, the kind and degree of freedom of their satellite electrons, and with other physical properties, indicates that the solar absorptivity/thermal emissivity ratio ($a_s/e$) of some materials is changeable and can be induced by those factors which produce alteration of the molecular structure, the electron population, or both in the materials. Among the physical phenomena involving such changes are: phase changes, electroluminescence, semiconductivity, photovoltaic effect and electro-optical polarization. In the present invention some of these physical phenomena are exploited in a controlled manner to construct controllable $a_s/e$ ratio panels.

A more complete appreciation of the invention and many of the attendant advantages thereof will be readily apparent as the same becomes better understood by reference to the following more detailed description when considered in connection with the accompanying drawings, wherein.

Figure 1:
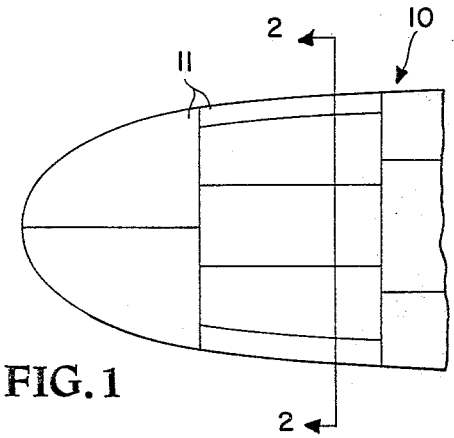
FIG. 1 is a partial view of a space vehicle or like enclosure employing a thermal control panel construction utilizing the photovoltaic effect according to the present invention.

Referring now more particularly to the drawings wherein like reference numerals designate identical or corresponding parts throughout the several views, and more particularly to FIG. 1, there is shown a space vehicle generally designated by reference numeral 10 and provided with an exterior surface area of thermosensitive panels constructed in accordance with present invention as designated by the reference numeral 11. In operation, vehicle 10 is propelled into the upper atmosphere on its space mission by a suitable rocket booster system, not shown, which may be ejected therefrom in a conventional manner as required for the particular space mission to be accomplished.

Figure 2:
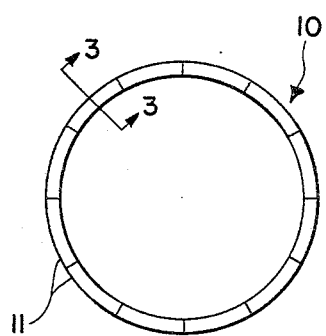
FIG. 2 is a section on line 2—2 of FIG. 1.

As shown more clearly in FIG. 2, the exposed surface of vehicle 10 consists of a plurality of panels 11 disposed completely about the exterior vehicle surface. It is also readily apparent that the entire exterior surface of vehicle 10 may be in the form of a single laminate thermal control panel where so desired.

Figure 3:
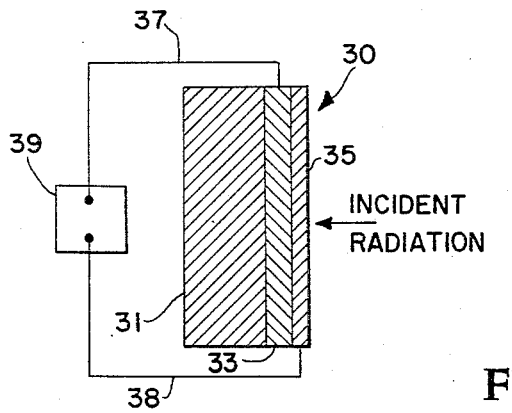
FIG. 3 is a schematic section of a spacecraft panel taken along line 3—3 of FIG. 2 and illustrating one embodiment of the present invention illustrating the photovoltaic effect.

Referring now more particularly to FIG. 3, there is schematically shown a panel, generally designated by reference numeral 30 and including an interior support 31 having a two-laminate exterior integrally secured thereto. Support 31 constitutes the exterior wall or skin of a suitable space vehicle 10 or other enclosure in which temperature control upon exposure to incident radiation constitutes a problem. The two-laminate exterior consists of an exposed layer 35 and an inner layer 33 integral therewith and disposed intermediate support 31 and layer 35. A pair of conductive lead wires 37 and 38 connect, respectively, with layers 33 and 35 and lead to a suitable electrical terminal box 39. In operation, layers 33 and 35, being of dissimilar materials and in contact with each other, form a junction which, when subjected to radiant energy, as designated by the arrow in FIG. 3, exhibits the photovoltaic effect by generating an electrical potential across the junction. This electrical potential is detectable at the electrical terminal 39. Layer 35 of panel 30 thus forms the face upon which the radiant energy is incident and, accordingly, is made very thin to permit penetration of the radiation to its junction with layer 33. The solar absorptivity/thermal emissivity ratio ($a_s/e$) of panel 30 can thus be made to undergo change by applying an electrical potential to terminals 39, from a suitable source, not shown, across the junction formed by layers 33 and 35. The $a_s/e$ ratio of panel 30 can also be changed by connecting the terminals of conductive wires 37 and 38 to each other. Controllable $a_s/e$ ratio panels have been constructed and tested in which layer 33 was nickel and layer 35 barium and also in which layer 33 was copper and layer 35 lead sulfide. Obviously, other suitable dissimilar conductive materials could be employed for these layers within the scope of the present invention.

Figure 4:
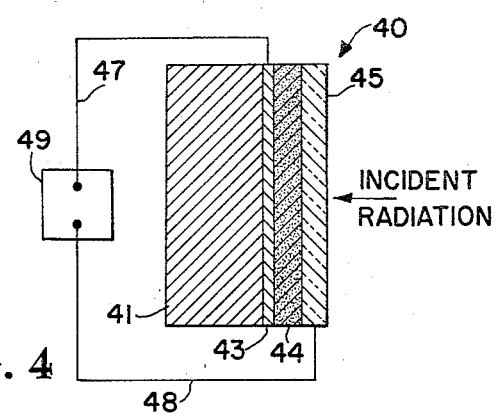
FIG. 4 illustrates an enclosure panel employing the semiconductivity effect for thermal control.
Figure 5:
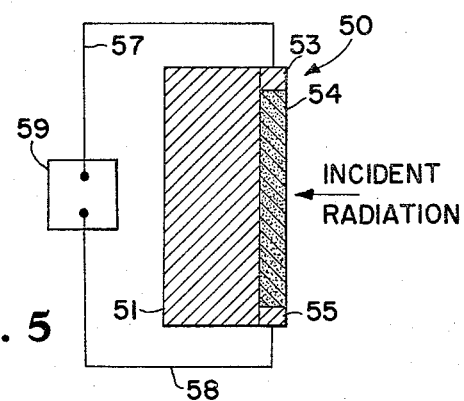
FIG. 5 is a schematic representation of a modified enclosure panel also utilizing the semiconductive effect for thermal control.

Referring now to FIGS. 4 and 5, controllable $a_s/e$ ratio panels employing the phenomenon of semiconductivity are shown. In FIG. 4, the controllable $a_s/e$ panel is generally designated by reference numeral 40 and includes an interior support 41 with a three-layer laminate exterior integrally attached thereto. Support 41 is similar to support 31 described previously and constitutes the exterior wall or skin of a suitable space vehicle or other enclosure in which temperature control upon exposure to incident radiation constitutes a problem. The three-layer laminate on support 41 consists of an adjacent or inner layer of material 43, an outer or exposed layer 45 and an intermediate layer 44 disposed between layers 43 and 45. A pair of electrical conductive lead wires 47 and 48 connect, respectively, with layers 43 and 45 and lead to a suitable terminal box 49. In this embodiment, the inner layer 43 is formed of any suitable conductive material, such for example as those described hereinabove in reference to FIG. 3; intermediate layer 44 is formed of a semiconductor material, such for example n-type germanium having approximately $10^{16}$ donars per cubic centimeter; and, layer 45 is a transparent electrical conductor, such for example a very thin layer of vapor deposited stannic oxide, or the like, through which incident radiation can pass to reach layer 44.

In FIG. 5, the controllable $a_s/e$ panel is designated generally by reference numeral 50 and includes an interior support 51 which may be any suitable nonelectrical conductive material and constituting an enclosure skin. A pair of electrical conductive strips 53 and 55 are diposed in spaced relationship and secured to support 51 in a conventional manner. A layer of semiconductor material 54, such for example the semiconductor described hereinbefore in reference to FIG. 4, is secured to support 51 filling the space between conductive strips 53 and 55 and making electrical contact therewith. A pair of electrical lead wires 57 and 58 lead, respectively, from conductive strips 53 and 55 to connect with an electrical terminal box 59.

In operaton of the embodiments of FIG. 4 and FIG 5, changes in the solar absorptivity/thermal emissivity ratios of the respective panels may be readily made by applying an electrical potential to the respective terminal box, as shown, to compensate for changes in the incident radiation received by the respective panels and thereby achieve thermal balance within the respective enclosures during changes in the incident radiation.

Figure 6:
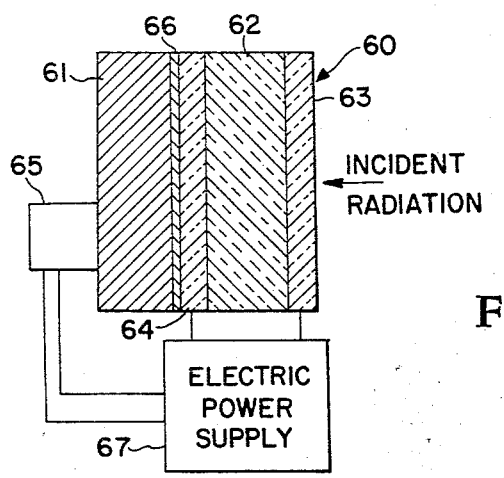
FIG. 6 is a schematic representation of an enclosure panel utilizing the electro-optical polarization effect for thermal control.

Referring now to FIG. 6, a controllable $a_s/e$ ratio panel employing the phenomenon of electro-optical polarization is shown and generally designated by reference numeral 60. This particular panel utilizes the known phenomena that some transparent dielectric materials possess the physical property characteristic of separating ordinary nonpolarized electromagnetic radiation incident thereon, when subjected to an electric field, into two parts. That is, one part of the separated radiation is transmitted through the dielectric material and is in whole or partially polarized in one direction while the other part of the separated radiation is reflected and partially or completely polarized at a right angle to the plane of polarization of the transmitted part.

Examples of materials possessing this physical property characteristic are crystals of ammonium dihydrogen phosphate and potassium dihydrogen phosphate, when cut into layers such that the Z–0 axis of the crystals are perpendicular to the faces of the layers, and the electric field is applied parallel the Z–0 crystal axis.

Thus, in FIG. 6, a layer of the described electro-optical material 62 is disposed between two transparent electric conductors 63 and 64. Transparent conductor 64 is secured to support 61 which may constitute the exterior wall or skin of a suitable space vehicle or other enclosure in which temperature control upon exposure to incident radiation is a problem. An absorber of electromagnetic radiation 66, such for example a layer of optically black paint or the like, is disposed on that surface of support 61 to which transparent layer 64 is secured.

A temperature sensor 65, such for example a bimetallic thermometer, is provided in thermal contact with support 61 and contains a conventional electric switch for causing electric power supply 67 to be selectively turned on and off in response to predetermined temperatures sensed by sensor 65. Power supply 67 is in electrical connection with transparent conductors 63 and 64.

In operation, when electromagnetic radiation is incident upon the front face of panel 60, as designated by the arrow, and no electric field is applied to layer 62, the radiation passes, respectively, through conductive layer 63, electro-optical layer 62 and transparent conductive layer 64 before being incident upon and absorbed by the radiation absorbing material 66. The absorbed radiation causes the temperature of support 61 to increase with the temperature change being sensed by temperature sensor 65.

When the temperature reaches a predetermined level, temperature sensor 65 effects actuation, in a conventional manner, of electric power supply 67 to cause an electric potential to be applied across conductor layers 63 and 64, thereby applying an electric field to electro-optical layer 62. The electric field causes layer 62 to change its optical characteristics to thereby reflect back, through layer 63, part of the incident electromagnetic radiation and diminish the electromagnetic radiation incident upon the absorbing material 66. This reduction of radiation incident upon and absorbed by the absorbing layer causes a decrease in temperature of support 61 which, upon reaching the predetermined minimum, causes temperature sensor 65 to actuate a switch, not shown, shutting off power supply 67 and thereby removing the electric field from electro-optical layer 62.

The amount of radiation absorbed by the absorbing layer 66 is automatically regulated to that required to hold panel 60 in the temperature range at which temperature sensor 65 actuates power supply 67. By adjusting the temperature at which the temperature sensor actuates power supply 67, the control temperature of panel 60 can be readily adjusted. Thus, panel 60 is not only a changeable $a_s/e$ ratio panel, but one that automatically regulates its temperature to a given adjustable control temperature.

Figure 7:
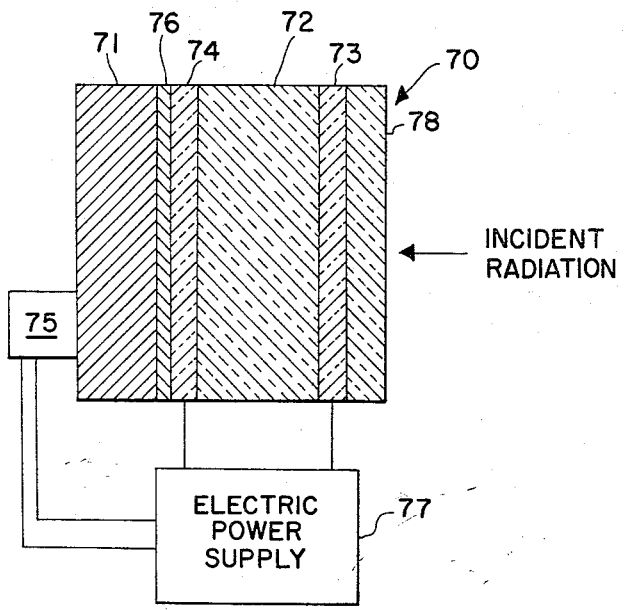
FIG. 7 illustrates a slight modification of the panel shown in FIG. 6.

Referring now to FIG. 7, a slight modification of the electro-optical panel of FIG. 6 is shown. In this embodiment, the panel is generally designated by reference numeral 70 and includes a front panel 78 of polarizing material, such for example Polaroid. Polarizing layer 78 is backed, respectively, by first transparent conductive layer 73, electro-optical layer 72, second transparent conductive layer 74, radiation absorbing layer 76 and support or enclosure wall 71. A temperature sensor 75 and electric power supply 77, performing in a like manner to these equivalent parts described hereinbefore in reference to the embodiment shown in FIG. 6, are also provided in operative connection with panel 70.

In operation of panel 70, polarizing layer 78 reflects part of the incident radiation received thereon as plane polarized radiation and transmits part of the incident radiation as plane polarized radiation. When no electric field is applied to electro-optical layer 72, the polarized radiation passing through layer 78 passes through first transparent conductor 73, electro-optical layer 72, second transparent layer 74 and is incident upon and absorbed by radiation absorbing layer 76. This absorption of radiation causes the temperature of panel 70 to increase with the rising temperature in support 71 being sensed by temperature sensor 75. When the predetermined control temperature of panel 70 is reached, sensor 75 actuates power supply 77 through a suitable switch, not shown, to apply an electrical potential across conductors 73 and 74.

This electrical potential applies an electrical field to the electro-optical material 72 which changes its optical characteristics such that it no longer transmits, but reflects, the plane polarized radiation incident upon it from the polarizing layer 78 back through transparent conductor 73 and polarizing layer 78 and out of panel 70. This diminishes the amount of radiation reaching absorbing layer 76 to cause the temperature of panel 70 to begin decreasing. However, as soon as the panel temperature starts to decrease, temperature sensor 75 detects the temperature change and shuts off power supply 77 thereby removing the electric field from the electro-optical material 72 and restoring the polarized radiation upon absorbing layer 76 to arrest temperature decrease in panel 70. Thus, the temperature of panel 70 is maintained automatically at the temperature at which temperature sensor 75 is set to actuate power supply 77. Panel 70, also, is thus not only a changeable $a_s/e$ ratio panel but one that automatically maintains itself at the preset or adjustable control temperature.

Figure 8:
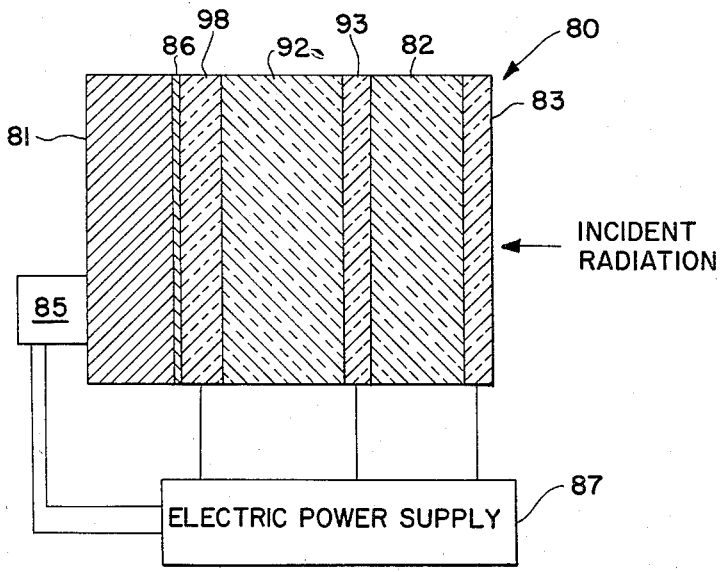
FIG. 8 illustrates another modification of a panel utilizing the electro-optical principle for thermal control of an enclosure.

Referring now to FIG. 8, a further embodiment of a controllable $a_s/e$ ratio panel employing the electro-optical phenomena is shown and generally designated by reference numeral 80. In this embodiment first and second layers of electro-optical material 82 and 92 are disposed in sandwiched relationship with first, second and third layers of transparent conductors, designated respectively by reference numerals 83, 93, and 98. The third transparent conductor layer 98 is disposed against a radiation absorbing layer 86 which, in turn, is disposed on support 81. A temperature sensor 85 and electric power supply 87, similar to those described hereinbefore, are also provided in operative connection with panel 80 with individual lead wires, not designated, leading from power supply 87 to each of the three transparent conductors 83, 93, and 98.

By this arrangement, electric fields may be applied to both the first and second electro-optical layers 82 and 92. When no electric field is applied to either of layers 82 and 92, the incident radiation upon the front of the panel, as designated by the arrow, passes, respectively, through first transparent conductor 83, first electro-optical layer 82, second transparent conductor 93, second electro-optical layer 92, and third transparent conductor 98 to be absorbed by radiation absorbing layer 86. The absorption of this radiation causes an increase in the temperature of panel 80 which is detected by temperature sensor 85.

Upon attainment of the selected control temperature, sensor 85 actuates power supply 87 to apply electrical potentials to each of the three transparent conductors 83, 93, and 98 such as to cause electro-optical layers 82 and 92 to undergo a change in their optical properties. Layer 82 then reflects part of the incident radiation back out of the panel while transmitting as plane polarized radiation only a part of the incident electromagnetic radiation.

The polarized radiation transmitted through first electro-optical layer 82 is then reflected by second electro-optical layer 92 and back out through the front of the panel. Thus, the radiation incident upon absorbing layer 86 is greatly diminished or completely stopped whereupon the temperature of panel 80 starts to decrease. However, as soon as the panel temperature starts decreasing, this is detected by sensor 85 which, by shutting off power supply 87, removes the electric fields from electro-optical layers 82 and 92 and restores the incidence of radiation upon absoring layer 86 to arrest decrease of panel temperature. The temperature of panel 80 thus is controlled to the temperature at which temperature sensor 85 influences power supply 87. By this arrangement, panel 80 is also a changeable $a_s/e$ ratio panel and one which automatically maintains itself at the desired adjusted control temperature.

The term "temperature sensor" as used herein to describe elements, 65, 75 and 85 is used in the generic sense to describe any conventional thermostatic system and the "power supply" 67, 77 and 87 may obviously be any conventional electrical power supply.

Although little mention has been made herein regarding onboard heat as may be generated by chemical or nuclear reactions, it is readily apparent that, by conduction, excess onboard heat may be readily transmitted to the spacecraft skin in each of the described embodiments of the invention to achieve thermal balance without adversely affecting the operation of the variable transparency characteristics of the composite panels described. It is readily apparent from the description herein that a combination spacecraft temperature control system employing the variable $a_s/e$ ratio technique could be constructed utilizing any one or any combination of the various embodiments described herein on all, any part of, or on different areas of a particular spacecraft, as so desired.

Although the invention has been described in connection with specific exemplary embodiments thereof, it is to be understood that the embodiments and specific layers and components are given by way of illustration only and are not to serve as limitations on applicant's invention. Accordingly, changes and modifications in the details of the invention described herein can obviously be made by those skilled in the art without departing from the scope of the invention as defined in the appended claims. It is also readily apparent that, although the invention has been specifically described in relation to temperature control of spacecraft, it is obviously applicable to any suitable inhabited or uninhabited enclosure such for example, homes, greenhouses, and the like. It is therefore to be understood that within the scope of the appended claims that the invention may be practiced otherwise than as specifically described.

What is claimed as new and desired to be secured by Letters Patent of the United States is:

1. A thermosensitive panel for achieving a predetermined temperature in an enclosure skin when said enclosure is subject to external solar or other high temperature electromagnetic radiation of steady or variable intensity either with or without flow of heat between the skin and the interior of the enclosure, comprising:
    a laminate structure having variable radiation absorptivity/emissivity property characteristics disposed on the exterior side of said enclosure skin and in thermal contact with said skin,
    said laminate structure including at least two electrically conductive layers, and having radiation absorptivity/emissivity characteristics such that the amount of incident radiation absorbed exceeds that emitted and causes the said skin temperature to increase, and
    electrical means for applying an electrical potential to said conductive layers to alter the radiation absorptivity/emissivity characteristics of the laminate structure such that the amount of radiation emitted exceeds that absorbed and causes said skin temperature to decrease, means for sensing temperature in said enclosure skin, and
    means for alternately applying and removing said electrical potential from said conductive layers so as to maintain the enclosure skin at a predetermined temperature.

2. The thermosensitive panel of claim 1 wherein said laminate structure includes first and second layers of conductive material,
    said first layer being adjacent said skin and said second layer being in contact with and overlying said first layer,
    said first and said second layers being formed of dissimilar materials so as to form a junction, and
    at least said second layer being readily penetrable by electromagnetic radiation to thereby cause the generation of an electrical potential across said junction.

3. The thermosensitive panel of claim 2 wherein said first layer is selected from the group consisting of nickel and copper and wherein said second layer is selected from the group consisting of barium and lead sulfide.

4. The thermosensitive panel of claim 1 wherein said laminate structure includes first and second layers of conductive material and a third layer of a semiconductor material sandwiched between said first and said second conductive layers,
    said second conductive layer of material being a transparent electric conductor.

5. The thermosensitive panel of claim 4 wherein said semiconductive layer comprises a thin layer of stannic oxide.

6. The thermosensitive panel of claim 1 wherein said laminate structure includes first and second transparent layers of conductive material and a third layer of an electro-optical material sandwiched between said first and second conductive layers, said electro-optical material having the inherent physical property characteristics of separating incident, nonpolarized, electromagnetic radiation into two parts, one part of said separated radiation being polarized in one direction and transmited through said electro-optical material and the other said part being reflected and plane polarized at a right angle to the plane of polarization of said first part.

7. The thermosensitive panel of claim 6 wherein said electro-optical material is selected from the group consisting of the crystals of ammonium dihydrogen phosphate and potassium dihydrogen phosphate with said crystals being so cut and arranged that the Z-0 axis of the crystals are perpendicular to the incident radiation and the electrical potential is applied parallel to the Z-0 crystal axis through said conductive layers.

8. The thermosensitive panel of claim 6 including a coating of radiation absorbing material on said skin and in thermal conductive contact with said laminate structure.

9. The thermosensitive panel of claim 1 wherein said laminate structure includes first, second and third layers of transparent electrical conductive material with a first layer of electro-optical material being disposed between said first and second layers of transparent conductive material and a second layer of electro-optical material being disposed between said second and third layer of conductive material.

10. The thermosensitive panel of claim 9 including: a coating of radiation absorbing material on said skin and in thermal conductive contact with said third transparent electrical conductive layer.

References Cited

UNITED STATES PATENTS

| | | | |
|---|---|---|---|
| 2,932,954 | 4/1960 | Evans | 62—3 |
| 3,174,537 | 3/1965 | Meyer | 165—133 X |
| 3,176,933 | 4/1965 | Clemmons | 244—1 |
| 3,205,937 | 9/1965 | Shyffer | 165—96 |

ROBERT A. O'LEARY, *Primary Examiner.*

M. A. ANTONAKAS, *Assistant Examiner.*